United States Patent
Haines et al.

(10) Patent No.: US 10,641,348 B2
(45) Date of Patent: May 5, 2020

(54) POPOFF VALVE IN HYDRAULIC ARRANGEMENT FOR MULTI-CLUTCH ASSEMBLY

(71) Applicant: Schaeffler Technologies AG & Co. KG, Herzogenaurach (DE)

(72) Inventors: Larry Haines, Coshocton, OH (US); Todd Sturgin, Wooster, OH (US); Joshua Hixenbaugh, Wooster, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 337 days.

(21) Appl. No.: 15/842,180

(22) Filed: Dec. 14, 2017

(65) Prior Publication Data

US 2019/0186560 A1 Jun. 20, 2019

(51) Int. Cl.
*F16D 48/02* (2006.01)

(52) U.S. Cl.
CPC .. *F16D 48/0206* (2013.01); *F16D 2048/0209* (2013.01); *F16D 2048/0221* (2013.01); *F16D 2048/0257* (2013.01)

(58) Field of Classification Search
CPC ......... F16D 48/0206; F16D 2048/0209; F16D 2048/0221; F16D 2048/0257
See application file for complete search history.

(56) References Cited

U.S. PATENT DOCUMENTS

| | | | | |
|---|---|---|---|---|
| 3,215,236 A | * | 11/1965 | Pietro | F16D 25/12 192/85.63 |
| 3,352,394 A | * | 11/1967 | Longshore | F16H 59/045 192/48.601 |
| 2010/0313970 A1 | * | 12/2010 | Mahapatro | F16D 48/02 137/484.2 |
| 2013/0296093 A1 | * | 11/2013 | Ross | F16D 25/14 475/127 |
| 2013/0341152 A1 | * | 12/2013 | Otanez | F16D 25/14 192/85.63 |
| 2019/0120376 A1 | * | 4/2019 | Gittins | F16H 63/3483 |

* cited by examiner

*Primary Examiner* — Jacob S. Scott
*Assistant Examiner* — Lori Wu
(74) *Attorney, Agent, or Firm* — Volpe and Koenig, P.C.

(57) ABSTRACT

An arrangement for a multi-clutch assembly including a popoff valve is disclosed. The arrangement also includes a first clutch, a second clutch, and a spool valve assembly. Depending on the mode, the popoff valve either provides a flowpath for residual hydraulic fluid from a latching chamber of the spool valve assembly to a vent of the popoff valve, or provides a flowpath for supplying hydraulic fluid to the latching chamber of the spool valve assembly via a fluid connection from a supply inlet to a latch port of the popoff valve.

15 Claims, 4 Drawing Sheets

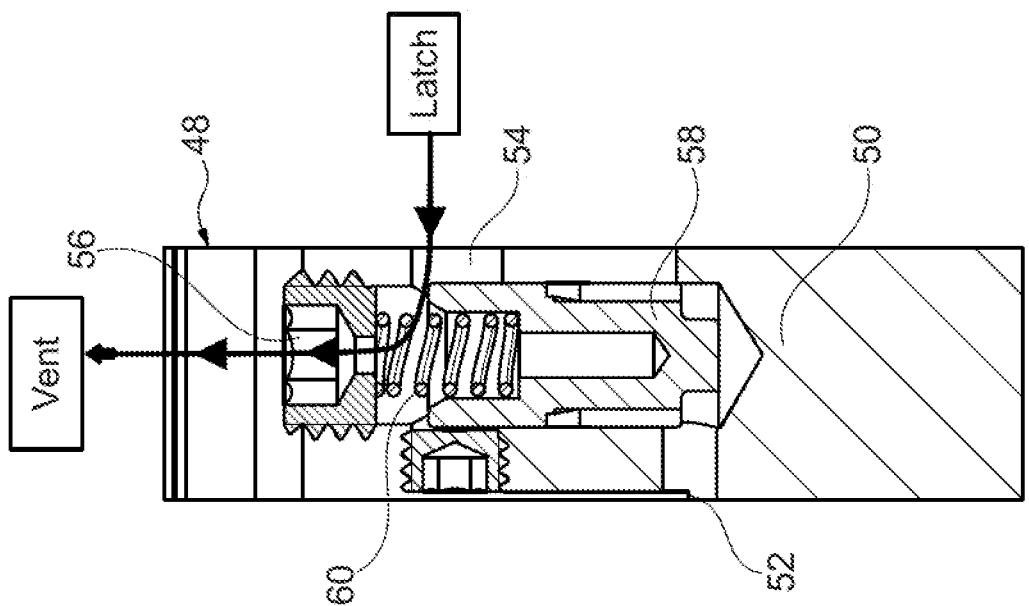
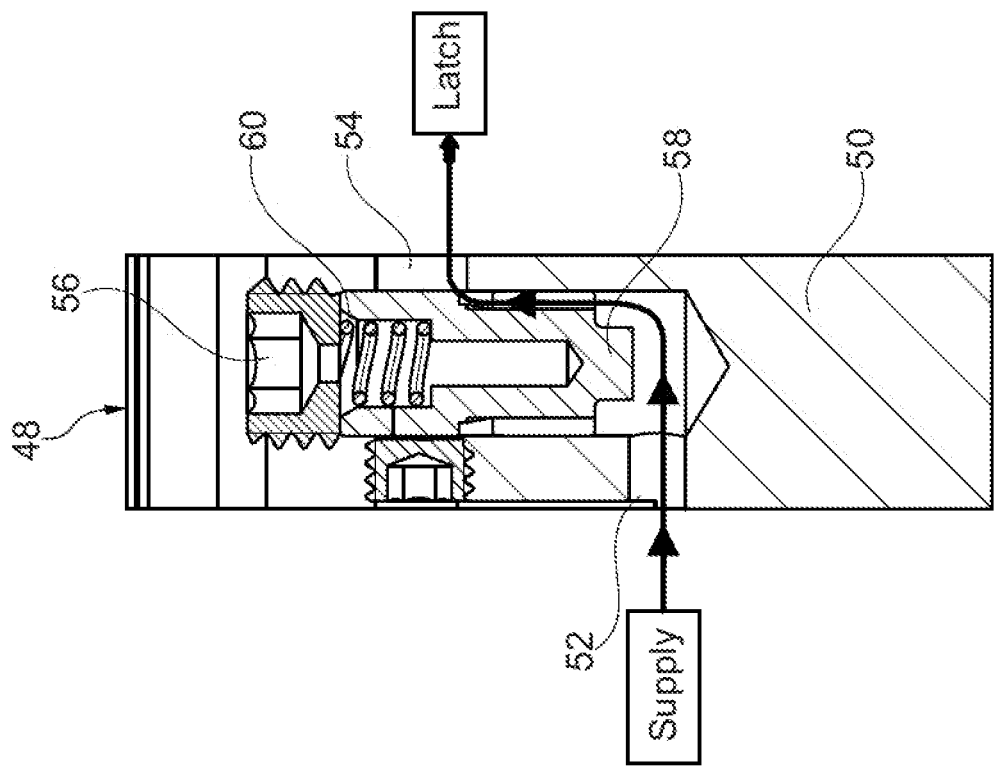
Fig. 4A
Fig. 4B

POPOFF VALVE IN HYDRAULIC ARRANGEMENT FOR MULTI-CLUTCH ASSEMBLY

FIELD OF INVENTION

This application is generally related to a hydraulic circuit for a multi-clutch assembly.

BACKGROUND

Known automotive transmission systems include a latching valve arrangement for controlling an associated valve body. These known latching valve arrangements can be configured to keep a clutch engaged for faster takeoff after stop-start events. During startup, these known transmissions typically automatically default to a higher gear clutch due to a spring engaging the associated valve body. As the system advances from a startup mode to a low speed mode, shifting occurs from the default higher gear clutch to a lower gear clutch. This type of shifting creates undesirable jolts and negatively affects durability. It would be desirable to provide a more reliable latching arrangement for a hydraulic system that mitigates jolting and improves durability.

SUMMARY

To address undesirable jolts and durability issues, an improved hydraulic arrangement for a multi-clutch assembly including a popoff valve is provided. The arrangement includes a first clutch and a second clutch connected to a hydraulic circuit. A spool valve assembly is arranged between a primary hydraulic fluid source and the first clutch and the second clutch. The spool valve assembly includes a housing with a movable valve body arranged therein. A first end of the housing defines a first inlet and a first chamber connected to an auxiliary hydraulic fluid source. A spool spring is arranged at a second end of the housing and engages the valve body. The second end of the housing defines a first latch port and a second chamber. The housing defines a first outlet in fluid communication with the first clutch, a second outlet in fluid communication with the second clutch, and a primary feed inlet connected to the primary hydraulic fluid source. The popoff valve includes a popoff housing defining a supply inlet in fluid connection with the second outlet of the spool valve assembly, a second latch port in fluid connection with the first latch port of the spool valve assembly, and a vent.

In a first mode, the valve body is forced upward by the spool spring to an upper position, hydraulic fluid at a first pressure level is provided to the second clutch such that the second clutch is disengaged, and the popoff valve provides a flowpath for residual hydraulic fluid from the second chamber of the housing of the spool valve assembly to the vent of the popoff valve.

In a second mode, the valve body is forced downward by pressure supplied to the first chamber of the spool valve assembly to a lower position, hydraulic fluid is provided to the first clutch via the spool valve assembly to engage the first clutch, and the popoff valve still provides the flowpath for residual hydraulic fluid from the second chamber of the housing of the spool valve assembly to the vent of the popoff valve.

In a third mode, pressure in the first chamber drops and the valve body is forced upward by the spool spring to the upper position, hydraulic fluid at a second pressure level greater than the first pressure level is provided to the second clutch to engage the second clutch, and the popoff valve provides a flowpath for supplying hydraulic fluid to the second chamber of the housing of the spool valve assembly via a fluid connection from the supply inlet to the second latch port of the popoff valve.

Although three primary modes are described herein, one of ordinary skill in the art would recognize from the present disclosure that any number of modes can be provided depending on the configuration of the clutches. Additionally, although two clutches are identified in the arrangement, one of ordinary skill in the art would recognize from the present disclosure that any number of clutches can be provided depending on the requirements for an associated transmission.

Preferred arrangements with one or more features of the disclosure are described below and in the claims.

BRIEF DESCRIPTION OF THE DRAWINGS

The foregoing Summary as well as the following Detailed Description will be best understood when read in conjunction with the appended drawings. In the drawings:

FIG. 4A illustrates a popoff valve for the arrangement of FIGS. 1-3 in a first position.

FIG. 4B illustrates the popoff valve of FIG. 4A in a second position.

DETAILED DESCRIPTION OF THE PREFERRED EMBODIMENTS

Figure 1:
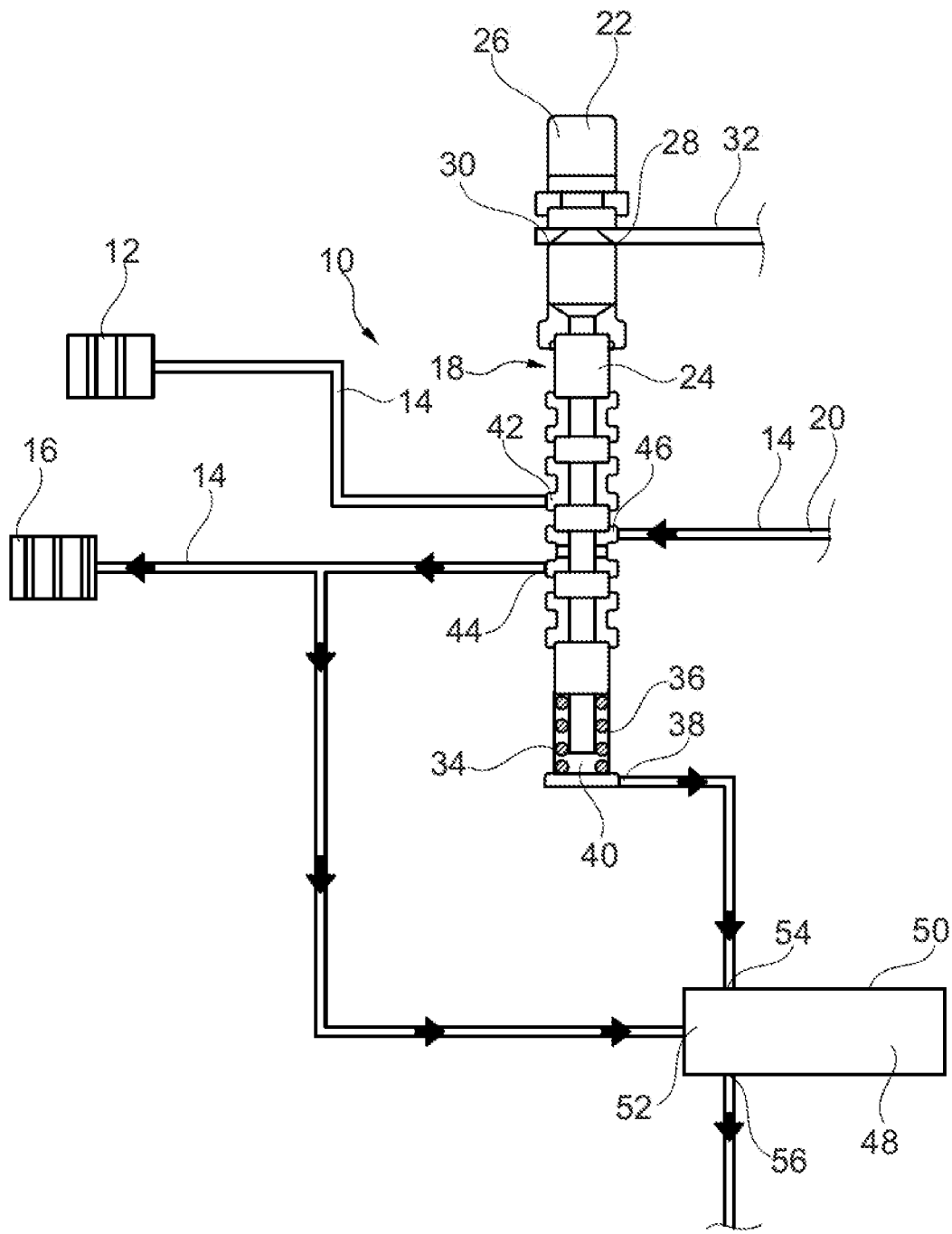
FIG. 1 illustrates a hydraulic circuit arrangement of a multi-clutch assembly according to one embodiment in a first mode.

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivates thereof, and words of similar import.

Figure 2:
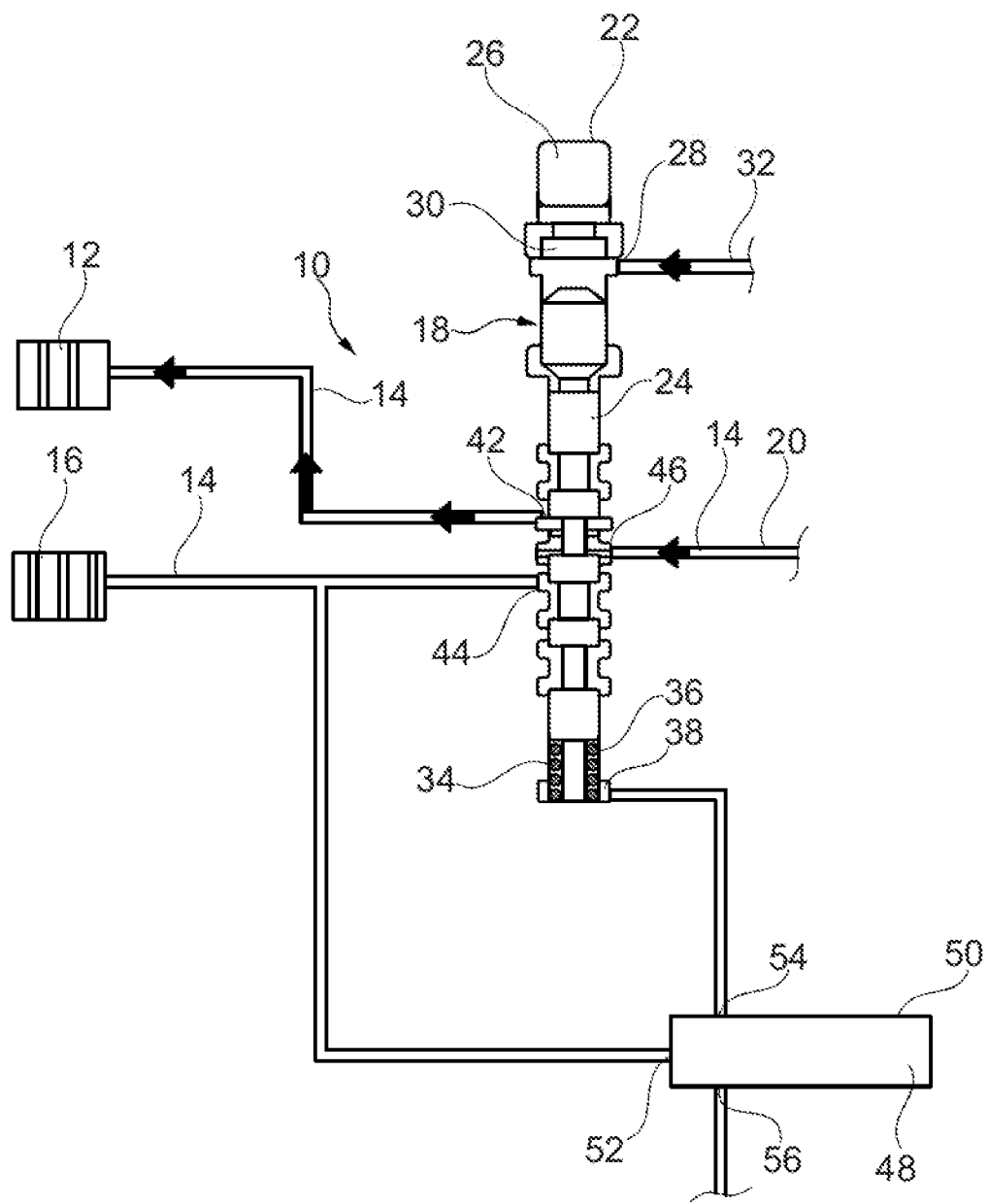
FIG. 2 illustrates the hydraulic circuit arrangement of the multi-clutch assembly in a second mode.
Figure 3:
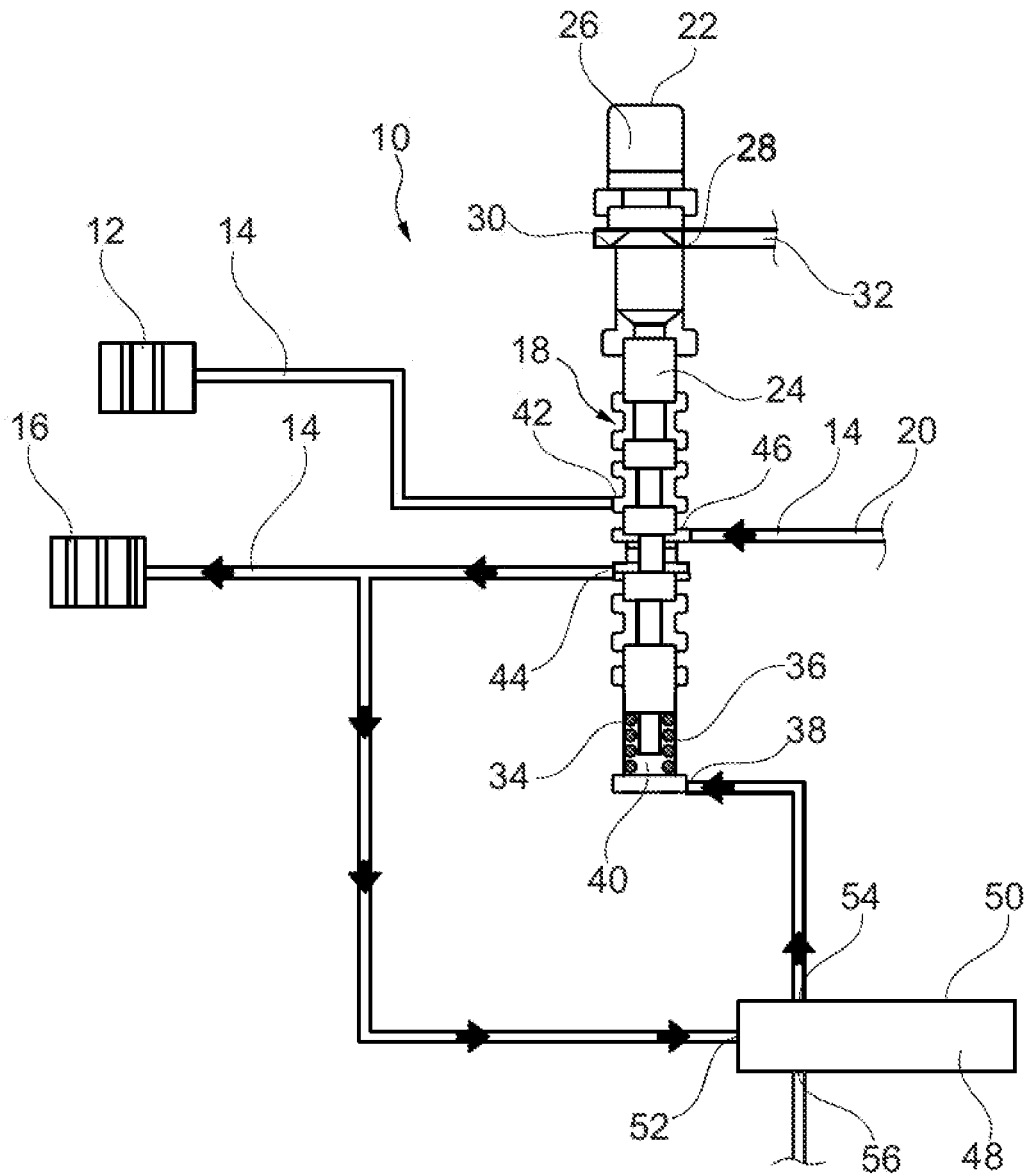
FIG. 3 illustrates the hydraulic circuit arrangement of the multi-clutch assembly in a third mode.

FIGS. 1-3 illustrate an arrangement 10 for a multi-clutch assembly according to an embodiment of the disclosure. The arrangement 10 includes a first clutch 12 connected to a hydraulic circuit 14, and a second clutch 16 connected to the hydraulic circuit 14. Although the figures illustrate two clutches 12, 16, one of ordinary skill in the art would recognize from the present disclosure that any number of clutches can be provided in the arrangement 10. In one embodiment, the first clutch 12 corresponds to a low gear clutch and the second clutch 16 corresponds to a high gear clutch. For example, the first clutch 12 can be a low/reverse clutch or a "B-R-1" clutch, while the second clutch 16 can be a "4-5-6" clutch. One of ordinary skill in the art would recognize from the present disclosure that alternative configurations of the clutches can be provided. Although not explicitly illustrated, one of ordinary skill in the art recognizes that the overall circuit for the transmission would include additional features, such as exhaust lines, additional solenoids, a pump, etc.

A spool valve assembly 18 is arranged between a primary hydraulic fluid source 20 and the first clutch 12 and the second clutch 16. The spool valve assembly 18 controls the flow of hydraulic fluid to either the first clutch 12 or the second clutch 16. The spool valve assembly 18 includes a housing 22 with a movable valve body 24 arranged therein. A first end 26 of the housing 22 defines a first inlet 28 and a first chamber 30 connected to an auxiliary hydraulic fluid source 32. A spool spring 34 is arranged at a second end 36 of the housing 22 and engages the valve body 24. The second end 36 of the housing 22 defines a first latch port 38 and a second chamber 40. The housing 22 defines a first outlet 42 in fluid communication with the first clutch 12 and a second outlet 44 in fluid communication with the second clutch 16. A primary feed inlet 46 is connected to a primary hydraulic fluid source 20. Based on a position of the movable valve body 24, the hydraulic fluid from the primary fluid source 20 is directed towards the first clutch 12 or the second clutch 16. The associated clutch 12, 16 becomes engaged based on a high pressure flow from the primary fluid source 20.

The arrangement 10 includes a popoff valve 48 with a popoff housing 50 defining a supply inlet 52 in fluid connection with the second outlet 44 of the spool valve assembly 18, a second latch port 54 in fluid connection with the first latch port 38 of the spool valve assembly 18, and a vent 56. In one embodiment, the popoff valve 48 includes a closing body 58 arranged within the popoff housing 50 and a popoff spring 60 that biases the closing body 58. As shown in FIGS. 4A and 4B, the vent 56 is defined on an axial end of the popoff valve 48, and the second latch port 54 and the supply inlet 52 are defined on a radial surface of the popoff valve 48. One of ordinary skill in the art would recognize that alternative arrangements of the popoff valve 48 can be used. As shown in FIGS. 4A and 4B, the popoff spring 60 is partially received within a pocket defined by the closing body 58. The popoff valve 48 performs two primary functions: (1) a latching function for assisting in holding the movable valve body 24 in an upper position in certain modes, and (2) a venting function to ensure that the second chamber 40 (i.e. the latch chamber) of the housing 22 of the spool valve assembly 18 is emptied during other modes. One of ordinary skill in the art would recognize from the present disclosure that the exact structure of the popoff valve 48 can be varied, as long as these two primary functions are provided.

As shown in FIG. 1, in a first mode, the valve body 24 is forced upward by the spool spring 34 to an upper position. This mode generally corresponds to an engine startup mode, during which a pump is initially turned on. The first chamber 26 is empty during this mode since the pump has not had time to build up pressure yet, and therefore there is no downward pressure on the valve body 24. Hydraulic fluid at a first pressure level (i.e. low pressure) is provided from the primary fluid source 20 to the second clutch 16 such that the second clutch 16 is disengaged. In this mode, the popoff valve 48 provides a flowpath for residual hydraulic fluid from the second chamber 40 of the housing 22 of the spool valve assembly 18 to the vent 56 of the popoff valve 48. FIG. 4B illustrates the popoff valve 48 in this mode. FIG. 4B shows the popoff spring 60 forcing the closing body 58 downward, allowing a flowpath for residual hydraulic fluid from the second latch port 54 (and the second chamber 40) to the vent 56. This mode allows hydraulic fluid to flow from the second chamber 40 of the housing 22 out through the vent 56. It is critical for normal operating of the arrangement 10 to ensure that the second chamber 40 of the housing 22 is relatively empty before the second mode in order to allow precise, controlled, and reliable movement of the valve body 24 based on pressure being supplied to the first chamber 26 of the spool valve assembly 18.

As shown in FIG. 2, in a second mode, the valve body 24 is forced downward by pressure supplied to the first chamber 26 of the spool valve assembly 18 to a lower position. A balance of forces is calibrated between the spring constant of the spool spring 34 and the pressure applied by hydraulic fluid pressure in the first chamber 26 such that the hydraulic fluid pressure overcomes the force of the spool spring 34. This mode generally corresponds to a low gear mode. In this mode, hydraulic fluid is provided from the primary fluid source 20 to the first clutch 12 via the spool valve assembly 18 to engage the first clutch 12, and the popoff valve 48 provides the flowpath for residual hydraulic fluid from the second chamber 40 of the housing 22 of the spool valve assembly 18 to the vent 56 of the popoff valve 48. In this mode, the popoff valve 48 continues to operate as a drain for the second chamber 40 of the housing 22, ensuring that the second chamber 40 is emptied and providing reliable positioning of the valve body 24 based on pressure being supplied to the first chamber 26.

As shown in FIG. 3, in a third mode, pressure in the first chamber 26 drops (i.e. the first chamber 26 is drained) and the valve body 24 is driven upward by the spool spring 34 to the upper position. Hydraulic fluid at a second pressure level, which is greater than the first pressure level in the first mode, is provided from the primary fluid source 20 to the second clutch 16 to engage the second clutch 16. The popoff valve 48 provides a flowpath for supplying hydraulic fluid to the second chamber 40 of the housing 22 of the spool valve assembly 18 via a fluid connection from the supply inlet 52 to the second latch port 54 of the popoff valve 48. In this mode, the popoff valve 48 acts as a latching mechanism for holding the valve body 24 in the upper position. Due to the upward force being applied by the spool spring 34 and the additional force provided by hydraulic fluid supplied to the second chamber 40 via the popoff valve 48, the valve body 24 is reliably held in the upper position during this mode. FIG. 4A illustrates this mode of the popoff valve 48, and shows the flow of hydraulic fluid from the supply inlet 52 to the second latch port 54. The closing body 58 is driven upward by high pressure hydraulic fluid and overcomes the force of the spool spring 60 to open the passage to the second latch port 54.

In one embodiment, the first mode corresponds to a startup mode for an engine associated with the arrangement 10, the second mode corresponds to a low gear mode, and the third mode corresponds to a high gear mode. One of ordinary skill in the art would recognize that alternative modes and configurations can be provided based on the present disclosure.

Having thus described various embodiments of the present arrangement in detail, it will be appreciated and apparent to those skilled in the art that many changes, only a few of which are exemplified in the detailed description above, could be made in the arrangement according to the disclosure without altering the inventive concepts and principles embodied therein. The present embodiments are therefore to be considered in all respects as illustrative and not restrictive, the scope of the disclosure being indicated by the appended claims rather than by the foregoing description, and all changes which come within the meaning and range of equivalency of the claims are therefore to be embraced therein.

LOG OF REFERENCE NUMERALS arrangement 10
first clutch 12
hydraulic circuit 14
second clutch 16
spool valve assembly 18
primary hydraulic fluid source 20
housing 22
movable valve body 24
first end 26
first inlet 28
first chamber 30
auxiliary hydraulic fluid source 32
spool spring 34
second end 36
first latch port 38
second chamber 40
first outlet 42
second outlet 44
primary feed inlet 46
popoff valve 48
popoff housing 50
supply inlet 52
second latch port 54
vent 56
closing body 58
popoff spring 60

What is claimed is:

1. An arrangement for a multi-clutch assembly, the arrangement comprising:
a first clutch connected to a hydraulic circuit;
a second clutch connected to the hydraulic circuit;
a spool valve assembly arranged between a primary hydraulic fluid source and the first clutch and the second clutch, the spool valve assembly including a housing with a movable valve body arranged therein, a first end of the housing defining a first inlet and a first chamber connected to an auxiliary hydraulic fluid source, a spool spring at a second end of the housing engages the valve body, the second end of the housing defining a first latch port and a second chamber, the housing defines a first outlet in fluid communication with the first clutch, a second outlet in fluid communication with the second clutch, and a primary feed inlet connected to the primary hydraulic fluid source;
a popoff valve including a supply inlet in fluid connection with the second outlet of the spool valve assembly, a second latch port in fluid connection with the first latch port of the spool valve assembly, and a vent;
(a) in a first mode, the valve body is forced upward by the spool spring to an upper position, hydraulic fluid at a first pressure level is provided to the second clutch such that the second clutch is disengaged, and the popoff valve provides a flowpath for residual hydraulic fluid from the second chamber of the housing of the spool valve assembly to the vent of the popoff valve;
(b) in a second mode, the valve body is forced downward by pressure supplied to the first chamber of the spool valve assembly to a lower position, hydraulic fluid is provided to the first clutch via the spool valve assembly to engage the first clutch, and the popoff valve provides the flowpath for residual hydraulic fluid from the second chamber of the housing of the spool valve assembly to the vent of the popoff valve; and
(c) in a third mode, pressure in the first chamber drops and the valve body is forced upward by the spool spring to the upper position, hydraulic fluid at a second pressure level greater than the first pressure level is provided to the second clutch to engage the second clutch, and the popoff valve provides a flowpath for supplying hydraulic fluid to the second chamber of the housing of the spool valve assembly via a fluid connection from the supply inlet to the second latch port of the popoff valve.

2. The arrangement of claim 1, wherein the first mode corresponds to a startup mode, the second mode corresponds to a low gear mode, and the third mode corresponds to a high gear mode.

3. The arrangement of claim 1, wherein the popoff valve comprises a closing body arranged within a popoff housing and a popoff spring that biases the closing body.

4. The arrangement of claim 3, wherein the closing body is driven against the popoff spring in the third mode to compress the popoff spring and provide a passage between the supply inlet and the second latch port of the popoff valve.

5. The arrangement of claim 3, wherein in the first mode and the second mode the popoff spring biases the closing body to (1) close a passage between the supply inlet and the second latch port, and (2) open a ventilation passage between the second latch port and the vent.

6. The arrangement of claim 3, wherein the popoff spring is partially received within a pocket defined by the closing body.

7. The arrangement of claim 1, wherein the primary feed inlet of the housing of the spool valve assembly is arranged axially between the first outlet and the second outlet.

8. The arrangement of claim 1, wherein the vent is defined on an axial end of the popoff valve, and the second latch port and the supply inlet are defined on a radial surface of the popoff valve.

9. An arrangement for a multi-clutch assembly, the arrangement comprising:
a first clutch connected to a hydraulic circuit;
a second clutch connected to the hydraulic circuit;
a spool valve assembly arranged between a primary hydraulic fluid source and the first clutch and the second clutch, the spool valve assembly providing a flowpath to either the first clutch or the second clutch depending on a position of a movable valve body, the spool valve assembly including a spring and a latch chamber on one side of the movable valve body and a control chamber on an opposite side of the movable valve body;
a popoff valve including a supply inlet in fluid connection with an outlet of the spool valve assembly, a latch port in fluid connection with the latch chamber of the spool valve assembly, and a vent;
(a) in a first mode, the valve body is forced upward by the spring, hydraulic fluid at a first pressure level is provided to the second clutch such that the second clutch is disengaged, and the popoff valve provides a flowpath for residual hydraulic fluid from the latch chamber of the spool valve assembly to the vent of the popoff valve;
(b) in a second mode, the valve body is forced downward by pressure supplied to the control chamber of the spool valve assembly, hydraulic fluid is provided to the first clutch via the spool valve assembly to engage the first clutch, and the popoff valve provides the flowpath for residual hydraulic fluid from the latch chamber of the spool valve assembly to the vent of the popoff valve; and
(c) in a third mode, pressure in the control chamber drops and the valve body is forced upward by the spring, hydraulic fluid at a second pressure level greater than the first pressure level is provided to the second clutch to engage the second clutch, and the popoff valve provides a flowpath for supplying hydraulic fluid to the latch chamber of the spool valve assembly via a fluid connection from the supply inlet to the latch port of the popoff valve.

10. The arrangement of claim 9, wherein the first mode corresponds to a startup mode, the second mode corresponds to a low gear mode, and the third mode corresponds to a high gear mode.

11. The arrangement of claim 9, wherein the popoff valve comprises a closing body arranged within a popoff housing and a popoff spring that biases the closing body.

12. The arrangement of claim 11, wherein the closing body is driven against the popoff spring in the third mode to compress the popoff spring and provide a passage between the supply inlet and the latch port of the popoff valve.

13. The arrangement of claim 11, wherein in the first mode and the second mode the popoff spring biases the closing body to (1) close a passage between the supply inlet and the latch port, and (2) open a ventilation passage between the latch port and the vent.

14. The arrangement of claim 11, wherein the popoff spring is partially received within a pocket defined by the closing body.

15. The arrangement of claim 9, wherein the vent is defined on an axial end of the popoff valve, and the latch port and the supply inlet are defined on a radial surface of the popoff valve.

* * * * *